US011003448B2

(12) United States Patent
Edvenson et al.

(10) Patent No.: US 11,003,448 B2
(45) Date of Patent: *May 11, 2021

(54) DSP SLICE CONFIGURED TO FORWARD OPERANDS TO ASSOCIATED DSP SLICES

(71) Applicant: MICRON TECHNOLOGY, INC., Boise, ID (US)

(72) Inventors: Gregory Edvenson, Seattle, WA (US); David Hulton, Seattle, WA (US); Jeremy Chritz, Seattle, WA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/116,869

(22) Filed: Aug. 29, 2018

(65) Prior Publication Data

US 2019/0108019 A1 Apr. 11, 2019

Related U.S. Application Data

(63) Continuation of application No. 15/726,293, filed on Oct. 5, 2017.

(51) Int. Cl.
*G06F 15/76* (2006.01)
*G06F 15/80* (2006.01)
*G06F 9/30* (2018.01)
*G06N 20/00* (2019.01)
*G06F 15/78* (2006.01)
*G06F 9/38* (2018.01)

(52) U.S. Cl.
CPC ........ *G06F 9/30018* (2013.01); *G06F 9/3016* (2013.01); *G06F 9/30109* (2013.01); *G06F 9/3893* (2013.01); *G06F 15/7867* (2013.01); *G06F 15/80* (2013.01); *G06N 20/00* (2019.01)

(58) Field of Classification Search
CPC ............................... G06F 9/3893; G06F 15/80
See application file for complete search history.

(56) References Cited

U.S. PATENT DOCUMENTS

| 7,577,820 | B1 | 8/2009 | Wentzlaff et al. |
| 8,327,187 | B1 | 12/2012 | Metcalf |
| 9,043,805 | B2 | 5/2015 | Kwon et al. |
| 9,081,634 | B1 | 7/2015 | Simkins et al. |
| 9,164,769 | B2 | 10/2015 | Kim et al. |

(Continued)

OTHER PUBLICATIONS

U.S. Appl. No. 16/117,529, titled "Configurable Digital Signal Processor Fracturing and Machine Learning Utilizing the Same", filed Aug. 30, 2018, pp. all.

(Continued)

*Primary Examiner* — Jacob Petranek
(74) *Attorney, Agent, or Firm* — Dorsey & Whitney LLP

(57) ABSTRACT

Apparatuses and methods are disclosed for an FPGA architecture that may improve processing speed and efficiency in processing less complex operands. Some applications may utilize operands that are less complex, such as operands that are 1, 2, or 4 bits, for example. In some examples, the DSP architecture may skip or avoid processing all received operands or may process a common operand more frequently than other operands. An example apparatus may include configurable logic blocks including DSP slices and an interconnected coupling the configurable logic blocks. An operand register of a DSP slice may include an operand input that is coupled to an output of that DSP slice.

18 Claims, 6 Drawing Sheets

(56) References Cited

U.S. PATENT DOCUMENTS

| | | |
|---|---|---|
| 10,114,917 B1 | 10/2018 | Venkataramani et al. |
| 2005/0144215 A1 | 6/2005 | Simkins et al. |
| 2005/0144216 A1 | 6/2005 | Simkins et al. |
| 2010/0192118 A1 | 7/2010 | Wendling et al. |
| 2016/0085721 A1 | 3/2016 | Abali et al. |
| 2019/0108018 A1 | 4/2019 | Edvenson et al. |
| 2019/0108040 A1 | 4/2019 | Edvenson et al. |
| 2019/0108042 A1 | 4/2019 | Edvenson et al. |

OTHER PUBLICATIONS

Ultrascale Architecture DSP Slice User Guide, UG579 (v.1.3), Nov. 24, 2015, p. 1-74.

Ultrascale Architecture DSP Slice User Guide, UG579 (v1.4), Jun. 1, 2017, p. 1-74.

U.S. Appl. No. 15/726,293, entitled "Forwarded Operand and Machine Learning Utilizing the Same", filed Oct. 5, 2017, pp. all.

U.S. Appl. No. 15/726,305, entitled "Configurable Digital Signal Processor Fracturing and Machine Learning Utilizing the Same", filed Oct. 5, 2017, pp, all.

DSP SLICE CONFIGURED TO FORWARD OPERANDS TO ASSOCIATED DSP SLICES

CROSS REFERENCE TO RELATED APPLICATION(S)

This application is a continuation of pending U.S. patent application Ser. No. 15/726,293 filed Oct. 5, 2017. The aforementioned application is incorporated herein by reference, in its entirety, for any purpose.

BACKGROUND

Many processing architectures exist to accomplish digital signal processing (DSP) capabilities, such as adders, multipliers, and other arithmetic logic units (ALUs) utilized in combination. For example, digital signal processing for wireless communications, such as digital baseband processing or digital front-end implementations, may be implemented using hardware (e.g. silicon) computing platforms. Multimedia processing and digital radio frequency (RF) processing may be implemented using an application-specific integrated circuit (ASIC). Accordingly, a variety of hardware platforms are available to implement digital signal processing, such as the ASIC, a digital signal processor (DSP) implemented as part of a field-programmable gate array (FPGA), or a system-on-chip (SoC). However, each of these solutions often requires implementing customized signal processing methods that are hardware-implementation specific. Such architectures, custom-built, may not be able to (or not efficiently able to) implement other applications that were not designed specifically for that hardware architecture.

DETAILED DESCRIPTION

Figure 1:
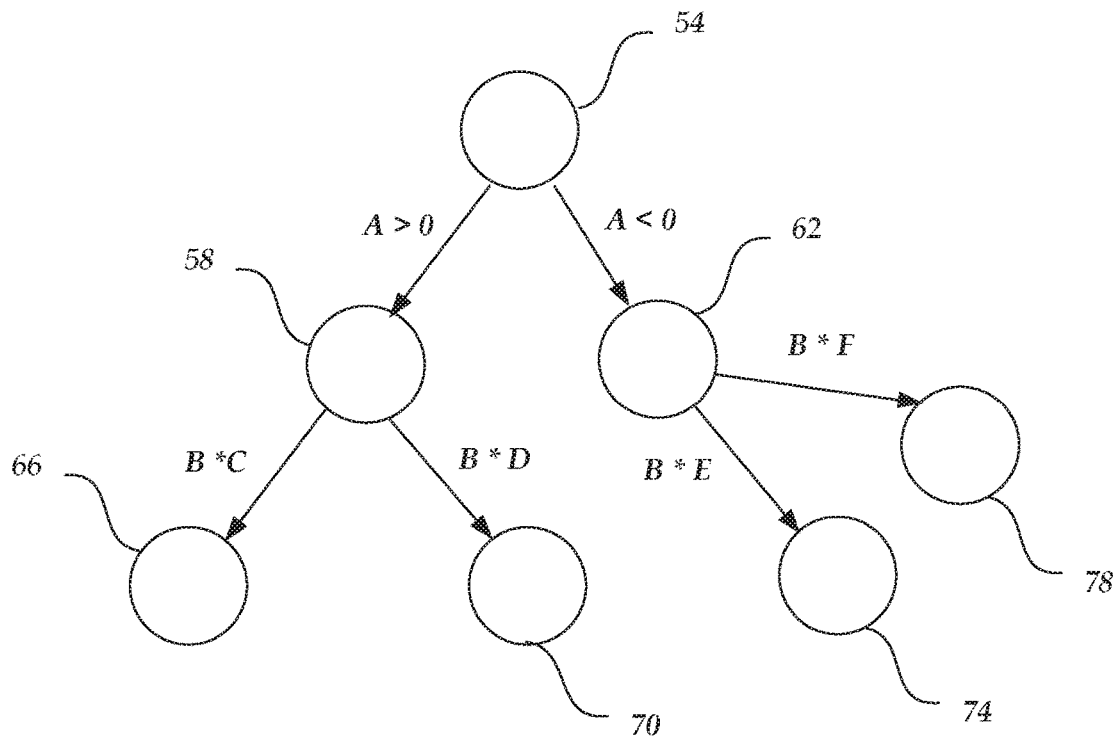
FIG. 1 is a block diagram of an example decision tree.

Example systems and methods described herein include digital signal processors (DSPs) that can forward an operand received as an input to another DSP, and the operand may be forwarded without a predicated operation performed on that operand by another DSP or component of the DSP (e.g., a DSP slice). Forwarding an operand from one DSP to another DSP may allow device, such as an integrated circuit, to perform various computations or operations more efficiently. Such techniques may, for instance, be employed in machine learning, artificial intelligence, or wireless communication schemes.

By way of example, a DSP may be utilized to forward a common operand to another DSP for the computation of a machine learning algorithm. In some current implementations of DSP slices in an FPGA architecture, a DSP may receive operands and process such operands. For example, the DSP may process the operand by utilizing the operand in a digital signal processing operation or any operand computation utilized in a method or process that the DSP implements. DSP slices may process complex operands, such as 8 or 16 bit operands, with other complex operands in a single DSP slice. However, machine learning applications (e.g., a machine learning algorithm) may not require complex operands. Some machine learning applications may optimize processing speed and efficiency over the complexity and precision that complex operands may provide to other applications. For example, some machine learning applications may utilize operands that are less complex, such as operands that are 1, 2, or 4 bits. Accordingly, it may be advantageous to provide a DSP architecture that does not process all received operands or process a common operand more frequently than other operands. In some examples, the DSP architecture may skip or avoid processing all received operands or may process a common operand more frequently than other operands Additionally, some machine learning applications may often involve processing of the same operand multiple times in a single DSP time flop. For example, a machine learning application may utilize an algorithm with a decision tree. A decision tree may be utilized in a variety of machine learning applications, such as to learn a wireless communications parameter, a data analytics parameter, a processing parameter for a hardware device unit, or a financial transaction parameter.

A decision tree can include a variety of paths that change based on a preceding branch of the tree. Each node in a decision tree may represent a different computation that stems from a common operand of that node. For example, a common operand combined with a variety of other operands may create respective branches that stem from a node at a certain level in the tree. The node of the tree may be the common operand, with each branch representative of a processing result (e.g., an intermediate or final processing result), when that common operand is combined with another operand.

In some applications, to determine the most efficient path in a decision tree, a computation of each branch may be used in ascertaining the most efficient path, for example, as defined by an optimization problem that the decision tree may be solving. For example, a sum, weighted combination, or any mathematical combination of branches in the tree may be representative of a path, with the most efficient path through the tree passing a threshold or passing the other computation results of logically similar paths. For example, a similar path may be a path that starts at an initial node and ends at a final node, with paths defined by different branches to traverse from the initial node to the final node. In some applications, the optimization problem may include a least squares solution to a set of training data that includes input and outputs for training a machine learning model. Other optimizations are possible, such as a convex optimization when training data may be modeled as a convex set.

In examples of systems described herein, rather than retrieving an operand from a cache and sending that same operand to each DSP slice of an FPGA, an existing DSP slice may forward a common operand to another DSP slice; or an existing FPGA architecture may forward the common operand along a column of a plurality of DSP slices. Accordingly, examples of systems, apparatuses, and methods described herein may allow for more efficient processing in machine learning applications, such as solving an optimization problem with a decision tree.

As described herein, a common operand in a machine learning application may be provided to logically similar DSP slices of an FPGA to process more efficiently that common operand. Accordingly, in the example of a common operand being a node of a tree, each branch of that tree may be computed substantially in parallel at each DSP slices, for example, as compared to a DSP slice that may sequentially compute each branch of that tree, with the common operand being retrieved multiple times in succession from an operand register.

As an example of a common operand being forwarded in a machine learning application, a decision tree implementation of a machine learning application may utilize such forwarding of a common operand, which may be referred to as performing one or more learning operations. FIG. 1 is a block diagram of an example decision tree 50. A decision tree may be utilized in machine learning operations to determine a parameter. For example, the decision tree 50 may be utilized to determine a likelihood of an event occurring, e.g., a cell phone call dropping. At tree node 54 of decision tree 50, a comparison operation may be executed regarding an operand A. For example, operand A may represent a probability of a cell phone being in a certain region. The compare operation may compare operand A to 0. Accordingly, a probability of the cell phone being in the certain region could be represented by a positive or negative integer corresponding to the probability, such that the 0 of the comparison is equivalent to a 50% probability. Accordingly, if the cell phone has such a probability, the decision tree 50 operates to a guide an operation according to another determination regarding another parameter of the likelihood of an event occurring. In the example, if the cell phone is in a certain region, decision flow proceeds to tree node 58 from tree node 54. If the cell phone is not in the certain region, decision flow proceeds to tree node 62 from tree node 54. Both such compare operations may be executed in an FPGA in one or more DSP slices. In such a case, the operand A may be forwarded to another DSP slice, such that both compare operations leading to tree nodes 58, 62 may occur in the same processing thread.

Continuing in the example of FIG. 1, a next operation may multiply the probability of the cell phone being in the region or not by the probability of that cell phone being connected to a particular base station and/or device. The operands C, D, E, and F may represent probabilities of various base stations and/or devices being connected to the example cell phone, with its probability of being connected being represented as operand B. Such multiply operations may be executed in an FPGA in one or more DSP slices. In such a case, the operand B may be forwarded to one or more DSP slices, such that both multiply operations leading to leaf nodes 66, 70, 74, and 78 may occur in the same processing thread. Accordingly, the branches of tree nodes 58, 62 may lead to leafs 66, 70, 74, and 78 that correspond to a likelihood of a cell phone call dropping for a cell phone connected to one of the base stations and/or devices represented by the operands C, D, E, and F, respectively, whether in the region or not. While described in the context of a cell phone call dropping, the decision tree 50 may guide various operations with varying likelihoods for various devices.

As another example of a decision tree 54 being utilized in a learning operation, a learning operation may determine the most efficient path from an initial node to a final node, having used common operands to define each intermediate node between the initial node and the final node, with the branches of nodes representative of computations at each node that combine the common operand with another operand. An efficient path in the decision tree 50 may be a path of the tree 50 from the tree node 54 to a leaf 66, 70, 74, and 78 with the lowest likelihood of the cell phone call dropping. Learning operations may be performed, for example, to ascertain parameters in various fields such as wireless communications or financial transactions. In each case, a learning operation may determine a parameter based on an efficient path of a decision tree that evaluates varying scenarios utilizing that parameter. For example, the parameter may be an initial node of the decision tree or a final node of the decision tree, and paths may be constructed that determine an efficient outcome for an operation that utilizes that parameter (e.g., as an initial tree node) or ends with that parameter (e.g., as a final leaf node).

Figure 2A:
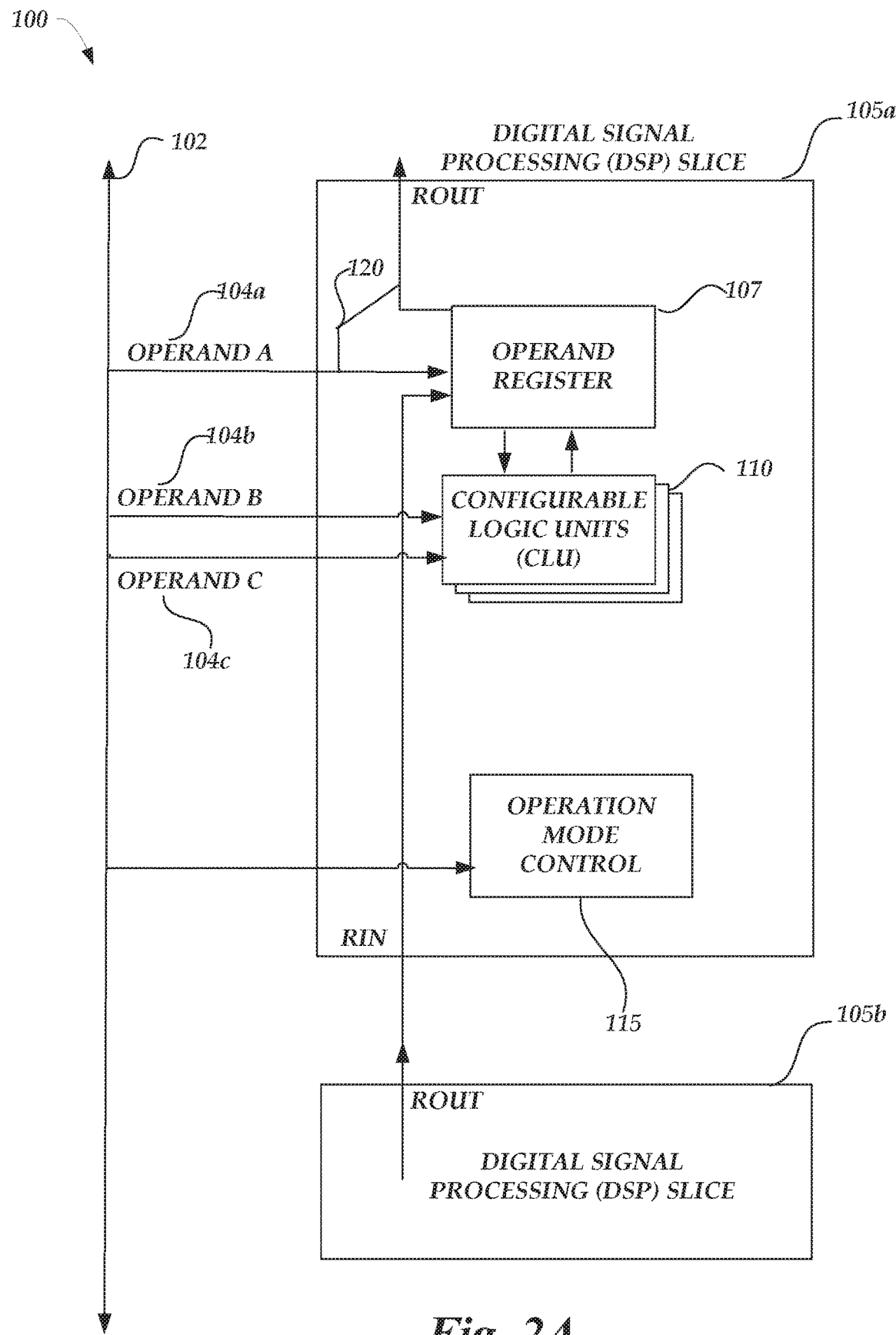
FIGS. 2A-3 are block diagrams of example apparatuses in accordance with various examples of the present disclosure.

FIG. 2A is a block diagram of an example apparatus 100 in accordance with an example of the present disclosure. The apparatus 100 includes an interconnect 102 and DSP slices 105a-105b coupled thereto. The DSP slices 105a-b may be logical circuits that may be coupled or cascaded to form different DSP circuits. For example, several DSP slices 105a-b may be cascaded to form a 256-point Fast Fourier Transform (FFT) circuit that processes certain time-domain inputs to generate a frequency-domain output. DSP slices 105a-b may be cascaded or coupled to other DSP slices to form other DSP circuits that perform DSP operations. While only two DSP slices 105a, 105b are depicted in FIG. 2A, it can be appreciated that apparatus 100 may include any number of DSP slices, for example, as described with reference to FIG. 3. Each DSP slice 105a-105b may include logic units (e.g., an arithmetic logic unit) that implement a portion or all of DSP operations performed by the apparatus 100. For example, DSP slice 105a may perform a first portion of a DSP operation including operand multiplication and DSP slice 105b may perform a second portion of that DSP operation including operand addition. The apparatus 100 may be implemented in various hardware platforms, including but not limited to: an ASIC, a DSP implemented in an FPGA, or a SoC.

The apparatus 100 may be configured with a cascade of DSP slices in which DSP slices are connected together such that a DSP slice may provide at least one output path as at least one input path to another DSP slice. In cascading multiple DSP slices together, the DSP slices may work in conjunction to implement a portion or all of a DSP operation performed by the apparatus 100. Accordingly, multiple DSP slices may be cascaded together to perform various types of DSP operations, such as filtering, equalization, transformations, matrix computations, etc. As depicted in FIG. 1, the DSP slice 105b includes an output path ROUT that is coupled to the DSP slice 105a as the input path RIN to the DSP slice 105a. Such an output path ROUT may provide operands processed or received by the DSP slice 105b to the DSP slice 105a. In various embodiments, operands may be various bit lengths, such as 2, 4, 8, 16, 18, 30, or 64 bits, for example. Operands may represent floating point numbers that include an exponent and mantissa. Operands may also represent complex numbers, such as in a Q15.1 representation, corresponding to 15 bits and 1 signed bit, in a 16 bit complex operand, for example. In some examples, while not shown in FIG. 1, the output path ROUT and/or the input path RIN may be coupled to the interconnect 102, such that the inputs and/or outputs of some of the DSP slices may be coupled via the interconnect 102, rather than direct connections between individual DSP slices, such as depicted in the cascaded coupling of DSP slice 105a to the DSP slice 105b. The output path ROUT may be an output of the DSP slice 105a In some examples, the output path ROUT may be in an input path to another DSP slice 105b, via the interconnect 102.

As described herein, which may be referred to as a second mode of the apparatus 100, the DSP slice 105a may forward an operand received directly from an input path coupled to the interconnect 102 to another DSP slice in the apparatus 100 via the output path ROUT of the DSP slice 105a. Accordingly, that forwarded operand may be utilized in a DSP operation by both DSP slice 105a, having received the common operand at the operand register 107, and DSP slice 105b, having received the common operand as a forwarded operand via the output path ROUT of the DSP slice 105a. In forwarding an operand directly between cascaded DSP slices, the apparatus 100 may operate more efficiently for certain DSP processing operations that include a common operand because several operations regarding the common operand may be performed in a less processing threads than conventionally processed in multiple processing threads, for example, during the second mode. The apparatus 100 may process the common operand at both the DSP slice 105a and the DSP slice 105b during substantially the same time period. For example, the DSP slices 105a and 105b may process the common operand in several DSP operations during a single processing thread of the apparatus 100. In some examples, the DSP slices 105a and 105b may process the common operand in several DSP operations, but in less processing threads than a conventional FPGA, such as a XILINX® FPGA.

The DSP slices 105a, 105b may be logically analogous or similar circuits (e.g. identical in some examples) that are cascaded in the apparatus 100 to perform a single or multiple DSP operations. For example, the DSP slice 105b may operate as a multiplier slice that cascades its output product via the output path ROUT as an input operand via the input path RIN of DSP slice 105a that may utilize the cascaded output product as an adder input for an adder operation in the DSP slice 105a. The DSP operations performed by the DSP slices 105a, 105 may change individually or in combination. While the DSP slice 105b may operate as a multiplier slice in at least one DSP time flop, it may be operate as an adder or another logical DSP function in another time flop.

The DSP slice 105a includes operand register 107, configurable logic units (CLUs) 110, and an operation mode control 115. The operand register 107 may include an input port for an input path coupled to the interconnect 102. The operand register 107 may also include input and output data paths to one or more CLUs 110. The operand register 107 may store an operand in its register such that a CLU 110 may request that operand for a calculation and/or computation. As depicted, the operand register 107 may receive and store the operand A 104a. The operand register 107 may also receive and store calculated operands from one or more of the CLUs 110.

A CLU 110 may perform a variety of arithmetic or DSP operations. A CLU 110 may be an arrangement of circuit elements or a single circuit that performs such an operation. For example, such circuit elements may include a various logical units, such as AND, OR, NOT, NAND, NOR, XOR, or XNOR gates. A CLU 110 may be used to implement an adder unit, a multiplier unit, an accumulator unit, a multiply-accumulate unit, a carry-in unit, a carry-out unit, a bit shifter, a logic unit configured with NAND gates, and/or generally any type of arithmetic logic unit or DSP logic unit that may process DSP operations. CLUs 110 may include input ports for input paths coupled to the interconnect 102. Each of the CLUs 110 or one or more of the CLUs 110 working in combination may receive and process operands via a corresponding input path to that CLU 110 or the one or more of the CLUs 110 working in combination. For example, a first CLU 110 may receive the operand B 104b to process that operand in a CLU configured as an adder that adds a stored operand from the operand register 107. A second CLU 110 may receive the operand C 104c to process that operand in a CLU configured as a multiplier that multiplies the result of an addition operation from the first CLU 110 with the operand C 104c.

The operation mode control 115 of each DSP slice may receive respective control signals indicating an operation mode for that DSP slice, such as an adder mode, a multiplier mode, an accumulator mode, a multiply-accumulate mode, a carry-in mode, a carry-out mode, or any type of arithmetic logic mode or DSP logic mode. In one implementation, the apparatus 100 may include a number of DSP slices 105a, 105b to perform machine learning application such as calculating nodes of a decision tree 50. Each of the DSP slices 105a, 105 may include a variety of input ports to receive and process operands from the interconnect 102. The apparatus 100 may provide operands on the interconnect 102 according to routing instructions stored or received by the apparatus 100.

The operation mode control 115 of the DSP slice 105a may receive a control signal that indicates an operation mode for that DSP slice 105a, such as a first mode or a second mode. The operation mode control 115 may be implemented using a mode register that stores a mode indicator based on a control signal indicating a mode for the DSP slice 105a. The second mode of the DSP slice 105a can control the DSP slice 105a to output an operand via an output path ROUT of the DSP slice 105a.

In a first mode, the DSP slice 105a may be controlled to output a calculated operand via the output path ROUT of the DSP slice 105a; while, in a second mode, the DSP slice 105a may be controlled to output a forward operand via the output path ROUT of the DSP slice 105a. In a first mode, the operand register 107 may output stored operands from the DSP slice 105a via the output path ROUT of the DSP slice 105a. The operand register 107 may have a stored operand that was calculated by a configurable logic unit 110 and stored therein. The operand register 107 may latch such a calculated operand. Such a calculated operand may be provided to the output path ROUT of the DSP slice 105a for further calculation as part of a cascaded DSP operation that may continue calculations at another DSP slice of the apparatus 100.

In a second mode, the DSP slice 105a may output from the DSP slice 105a operands forwarded from an input path of the DSP slice 105a. A forwarded operand may be received via an input port of the operand register 107. An input path for operands of the DSP slice 105a, which may be coupled to the interconnect 102, may be coupled to the output path ROUT of the DSP slice 105a. A connection 120 may be provided between an input path of the DSP slice 105a and an input path of a cascaded DSP slice to the DSP slice 105a. For example, an input path for operands of the DSP slice 105a (e.g., the input path of operand A 104a) to the output path ROUT of the DSP slice 105a. Such a connection 120 may be provided by a wire or a soldering in an integrated circuit.

The connection 120 may also be a circuit that forwards, or allows for forwarding, operands received, such as a flip-flop circuit at a certain time period. Accordingly, such a forwarded operand may be provided to the output path ROUT of the DSP slice 105a for further calculation as part of a cascaded DSP operation that may continue calculations at another DSP slice of the apparatus 100. In providing forwarded operands to additional DSP slices of the apparatus 100, multiple computations with the same operand, now a common operand to other DSP slices, may be computed for algorithms that may utilize a common operand, thereby advantageously improving processing speed of such algorithms in some examples. Providing forwarded operands to additional DSP slices of the apparatus 100 along cascaded input and output paths of coupled DSP slices may be referred to herein as providing forwarded operands along a column of DSP slices of the apparatus 100. A column may include a plurality of DSP slices and/or other functional elements in the apparatus 100. While not depicted in FIG. 1, DSP slices may also be cascaded across "rows," such that a DSP slice is coupled to more than one DSP slice, and may be logically cascaded in columns and rows across the apparatus 100.

DSP slices 105a, 105b can include various types of DSP elements, including but not limited to: operand registers, CLUs, and an operation mode control in the same manner as DSP slice 105a. DSP slice 105b may also include such elements in a different arrangement or with additional or less elements, provided that DSP slice 105b still has a register output ROUT, for example as depicted in FIG. 1. DSP slice 105b may represent a DSP slice in the apparatus 100 that is cascaded in a column-like fashion to the DSP slice 105a.

Other embodiments are possible, for example, the DSP slice 105b may be cascaded to an output of a CLU 110 of the DSP slice 105a, with a feedback path of the output of the CLU 110 to the interconnect 102 also being coupled to the output path ROUT of the DSP slice 105a, such that operands received from the interconnect 102 may be forwarded to a cascaded DSP slice in a row-like fashion; instead of providing the calculated operand that is outputted from the CLU 110 of the DSP slice 105a to the feedback path.

Figure 2B:
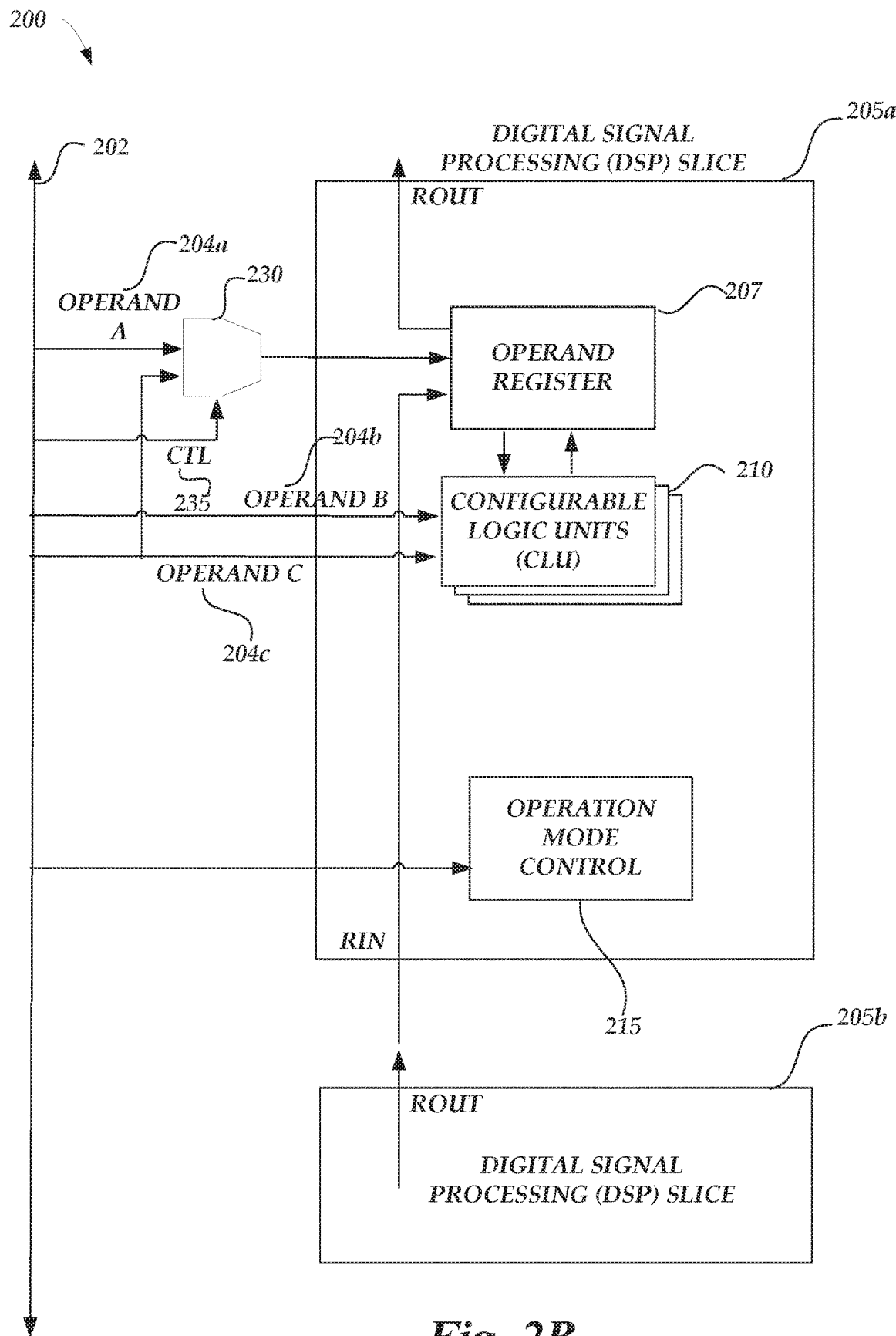

FIG. 2B is a block diagram of an example apparatus 200 in accordance with an embodiment of the present disclosure. The apparatus 200 includes an interconnect 102 and DSP slices 205a-205b coupled thereto. Similarly numbered elements of FIG. 2 as compared to FIG. 1 may be implemented by, be used to implement, and/or may operate in the same way as described above with reference to FIG. 1. Accordingly, CLUs 210 may operate in an analogous manner as CLUs 110 described above. While only two DSP slices 205a, 205b are depicted in FIG. 2, it can be appreciated that apparatus 200 may include any number of DSP slices, for example, as described with reference to FIG. 3. The apparatus 200 may cascade DSP slices together such that a DSP slice may provide at least one output path as at least one input path to another DSP slice. As depicted in FIG. 2, the DSP slice 105b includes an output path ROUT that is coupled to the DSP slice 205a as input/path RIN. Such an output path ROUT may provide operands processed or received by the DSP slice 205b to the DSP slice 205a. In some embodiments, while not shown in FIG. 2, the output path ROUT and/or the input path RIN may be coupled to the interconnect 202, such that the input/outputs of some of the DSP slices may be coupled via the interconnect 202, rather than direct connections between individual DSP slices, such as depicted in the cascaded coupling of DSP slice 205a to the DSP slice 205b. The apparatus 200 may be implemented in various hardware platforms, including but not limited to: an ASIC, a DSP implemented in an FPGA, or a SoC.

In some examples, in what may be referred to as a second mode of operation of the apparatus 200, the DSP slice 205a may broadcast an operand received directly from an input path coupled to the interconnect 202 to another DSP element of the DSP slice 205a in the apparatus 200 via an output of the switch 230 of the DSP slice 205a. In broadcasting such an operand in at least one DSP slice of the apparatus 200, the apparatus 200 may operate more efficiently for certain DSP processing operations that include a common operand. While only one switch 230 is depicted in FIG. 2, it can be appreciated that each DSP of the apparatus 200 may be coupled to a switch that receives operands from the interconnect 202, and selects an operand to be the selected operand provided to the operand register 207 in DSP slice 205a or a respective operand register in a respective DSP slice.

A third mode of the apparatus 200 described herein may be utilized in a parallel processing embodiment of a machine learning algorithm that may be processing a common operand along different branches. Faster processing time may be achieved in some examples, as compared to an FPGA that may retrieve the common operand from the interconnect 202 and store it first in a respective operand register at a different time period, or may request that same operand more than once to process each operation including a common operand.

Figure 3:
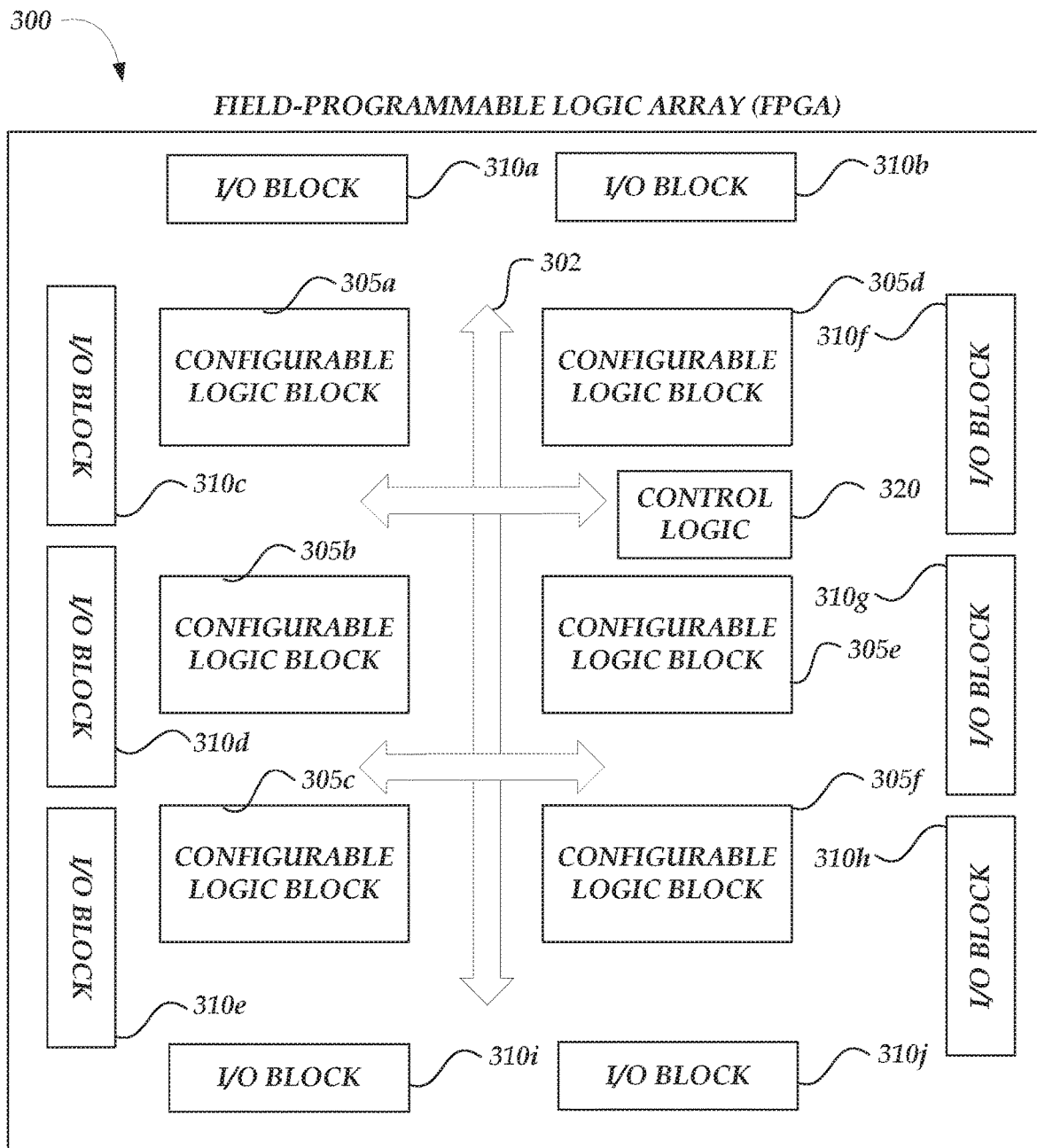

The switch 230 receives a control signal CTL 235 from the interconnect 202 that indicates to the switch a selection of the operand inputs. Input paths to the switch may include an input path for an operand A 204a and an input path coupled to an input path of the DSP slice 205a. As depicted in FIG. 3, the input path of the DSP slice 205 for the operand C 204c is coupled to the input path of the switch 230. Accordingly, if a common operand is determined to be provided to the DSP slice 205a for an operation including a common operand, the interconnect 202 may provide the common operand as operand C 204c, which will also be provided to an input path of the switch 230. For example, the control signal CTL 235 may be received as a control signal via the interconnect 202 from a control logic (e.g., control logic 320). The control signal may represent a determination as to whether the common operand is to be provided to the DSP slice 205a. For example, the determination that the common operand is to be provided to the DSP slice 205a may occur during execution of an instruction set for operations to be performed by the DSP slices 205a, 205b.

The operation mode control 215 of the DSP slice 205a may receive a control signal that indicates an operation mode for that DSP slice 205a, such as a first mode or a third mode. In some examples, the control signal CTL 235 may also be the control signal provided to the operation mode control 215. The operation mode control 215 may be implemented using a mode register that stores a mode indicator based on a control signal indicating a mode for the DSP slice 105a. The third mode of the DSP slice 105a can control a DSP slice to broadcast an operand to multiple DSP elements of a DSP slice. In a first mode, operand inputs of the DSP slice that are designated for certain operands may be provided their corresponding operands, such as operand A 204 along the input path of the operand register 207 as output from the switch 230, operand B 204b to CLU 210, and operand C to CLU 210. In a third mode, an operand input path may be shared with an input path of the switch 230 based, at least partly, on the operation mode control 215 indicating that a common operand is to be processed in the DSP slice 205a.

The switch 230 may select the input path with the provided common operand to be processed, such that the common operand is broadcast to multiple DSP elements of the DSP slice 205a, such as the operand register 207 and the CLUs 210. Accordingly, in contrast to the first mode in which the operand register 207 may store the operand A for computation by one or more of the CLUs 210, the operand register 207 may in third mode store the operand C for computation by one or more of the CLUs 210 via an input path of the operand register 207. The CLUs 210 may also receive the common operand, operand C 204c, via an input path of the DSP slice 205a.

In providing broadcasting operands to DSP elements of the DSP slice 205a, multiple computations with the same operand, now a common operand to other DSP elements of the DSP slice 205a, may be computed for algorithms that may utilize a common operand, thereby improving processing speed of such algorithms in some examples. Broadcasted operands may also be provided to additional cascaded DSP slices of the apparatus 200. Respective switches coupled to respective DSP slices may each select a common operand at the same DSP time flop to broadcast that operand in each DSP element for computations associated with that common operand, according to the system described herein.

FIG. 3 is a block diagram of an example apparatus 300 in accordance with an example of the present disclosure. The apparatus 300 includes an interconnect 302, with configurable logic blocks 305a-305f, I/O blocks 310a-310j, and control logic 320 coupled thereto. While only eight configurable logic blocks 305a-305f and ten I/O blocks 310a-310j are depicted in FIG. 3, it can be appreciated that apparatus 300 may include any number of configurable logic blocks and I/O blocks 310a-310j. The apparatus 300 may cascade configurable logic blocks 305a 305f together such that a configurable logic block 305a 305f may provide at least one output path as at least one input path to another configurable logic block. The apparatus 300 may be an FPGA.

A configurable logic block 305a-305f may be implemented using a programmable logic block, such as a computer-readable medium storing instructions, or a logic circuit comprising one or more logic units, such as one or more NAND gates. The configurable logic blocks 305a-305f may be cascaded across logical rows and columns with I/O blocks 310a-310j bounding respective rows and columns for connections external to the apparatus 300. The configurable logic blocks 305a-305f may implement a DSP slice that performs DSP operations, such as DSP slice 105a, 105b or DSP slices 205a, 205b. A configurable logic block 305a-305f being implemented as a DSP slice may be referred to as a DSP unit or a DSP block of the apparatus 300.

Certain configurable logic blocks 305a-305f configured to operate as DSP slices may be logically analogous or similar circuits that are cascaded in the apparatus 300 to perform a single or multiple DSP operations. The DSP operations performed by the DSP slices may change individually or in combination. An operation mode control of each DSP slice may receive respective control signals indicating an operation mode for each DSP slice, such as an adder mode, a multiplier mode, an accumulator mode, a multiply-accumulate mode, a carry-in mode, a carry-out mode, and/or any type of arithmetic logic mode or DSP logic mode.

The control logic 320 may include instructions sets (e.g., one or more program instructions or operations) to be performed by the configurable logic blocks 305a-305f. The control logic 320 may include, for example, computer software, hardware, firmware, or a combination thereof configured to provide instruction sets from a storage device to the configurable logic blocks 305a-305f. For example, the instruction sets may include instructions to perform certain logic or arithmetic operations on data, transmit data from one configurable logic block 305a-305f to another configurable logic block 305a-305f, or perform other operations. In some examples, an instruction set may be loaded onto the control logic 320 and include instructions that represent a determination as to whether a common operand is to be provided to a particular configurable logic block 305a-305f for an operation including a common operand. The control logic 320 may retrieve instructions for the configurable logic blocks 305a-305f from one or more memories, such as a volatile (e.g., dynamic random access memory (DRAM)) or non-volatile memory (e.g., Flash memory). The instruction sets may be stored in one or more data structures, such as a database. The control logic 320 may be configured to provide control signals to various circuits of the memory 100. For example, responsive to receiving a memory access command (e.g., read, write, program), the control logic 320 may provide control signals to control the configurable logic blocks 305a-305f to forward a common operand.

In one implementation, the apparatus 300 may include a number of configurable logic blocks 305a-305f, implemented as DSP slices, to perform machine learning application such as calculating nodes of a decision tree. Each of the DSP slices may include a variety of input ports to receive and process operands from the interconnect 102. The DSP slices may be implemented as DSP slices 105a, 105b and/or DSP slices 205a, 205b to more efficiently process an operation including a common operand. The apparatus 300 may provide operands (e.g., a common operand) on the interconnect 302 according to routing instructions stored or received by the apparatus 100.

Figure 4:
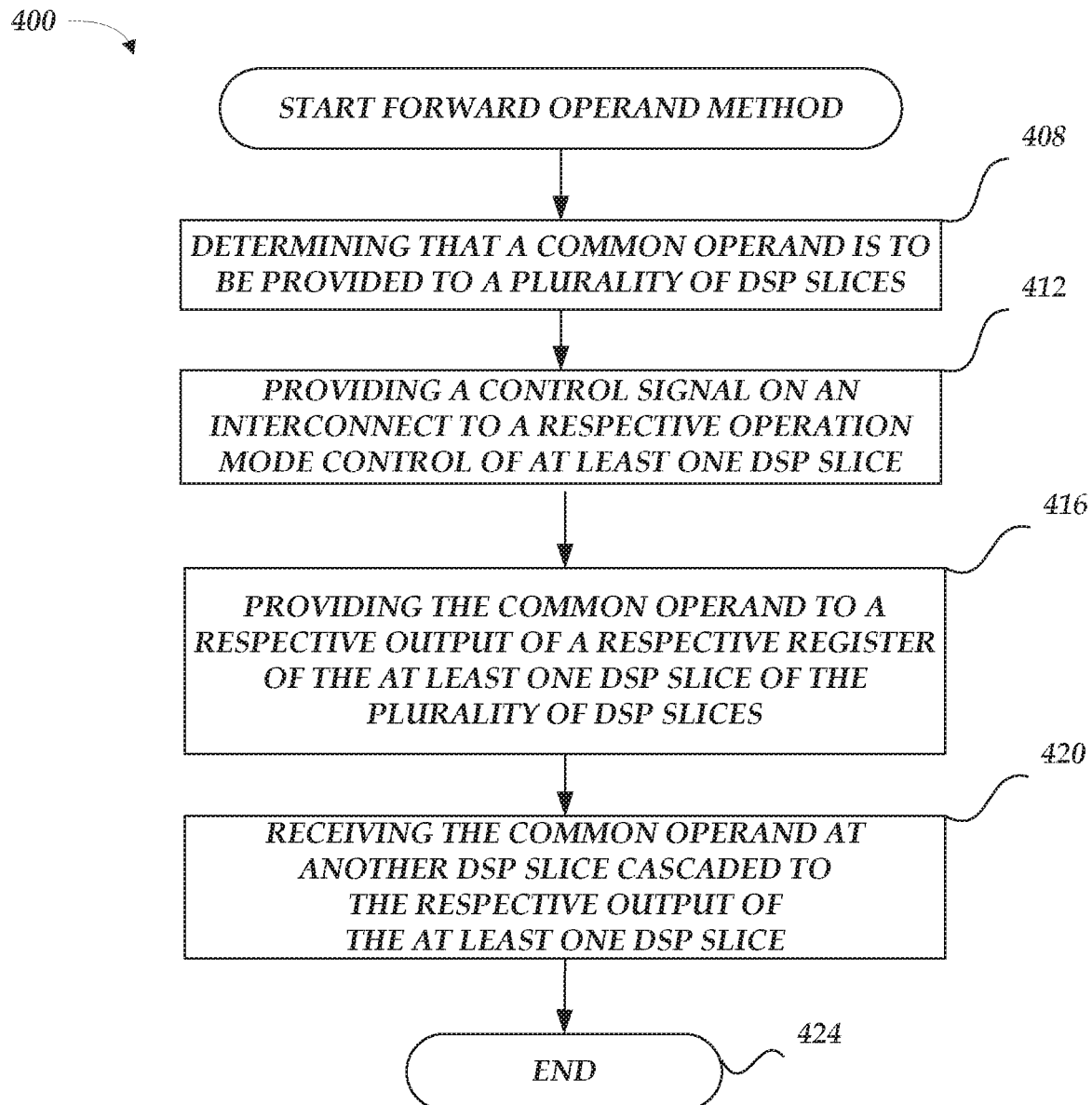
FIG. 4 is a flow diagram of an example method of forwarding an operand according to examples of the present disclosure.

FIG. 4 is a flowchart of a method 400 in accordance with examples described herein. Example method 400 may be implemented using, for example, apparatuses 100 in FIG. 1, or any system or combination of the systems depicted in FIGS. 1-3 described herein. The operations described in blocks 408-424 may be stored as control instructions in a computer-readable medium of an FPGA (e.g., the apparatus 100) or a memory accessible by the FPGA.

Example method 400 may begin the forward operand method. At block 408, the method 400 may include determining that a common operand is to be provided to a plurality of DSP slices. An operation being performed by an FPGA, such as apparatus 100, 200, or 300 may determine that a common operand is to be provided to DSP slices. In an example, a machine learning application may determine that a node of a decision tree is to be computed with multiple branches associated with a common operand. In such a case, a control unit of the FPGA or instructions executing control operations may determine that the common operand associated with the decision tree is to be provided to one or more DSP slices of an FPGA.

At block 412, method 400 may include providing a control signal on an interconnect to a respective operation mode control of at least one DSP slice. An operation mode control of a DSP slice may receive a control signal that indicates an operation mode for that DSP slice (e.g., DSP slice 105a), such as a first mode or a second mode.

At block 416, method 400 may include providing the common operand to a respective output of a respective register of the at least one DSP slice of the plurality of DSP slices. As described herein, in a second mode, the DSP slice 105a may output from the DSP slice (e.g., DSP slice 105a) operands forwarded from an input path of the DSP slice. A forwarded operand may be received via an input port of an operand register of the DSP slice.

At block 420, method 400 may include receiving the common operand at another DSP slice cascaded to the respective output of the at least one DSP slice. As described herein, such a forwarded, common operand may be provided to the output path ROUT of a DSP slice or further calculation as part of a cascaded DSP operation that may continue calculations at another DSP slice of the FPGA. In providing forwarded operands to additional DSP slices of the FPGA, multiple computations with the same operand, now a common operand to other DSP slices, may be computed for algorithms that may utilize a common operand, thereby improving processing speed of such algorithms.

The blocks included in the described example method 400 are for illustration purposes. In some examples, the blocks may be performed in a different order. In some other examples, various blocks may be eliminated. In still other cases, various blocks may be divided into additional blocks, supplemented with other blocks, or combined together into fewer blocks. Other variations of these specific blocks are contemplated, including changes in the order of the blocks, changes in the content of the blocks being split or combined into other blocks, etc.

Figure 5:
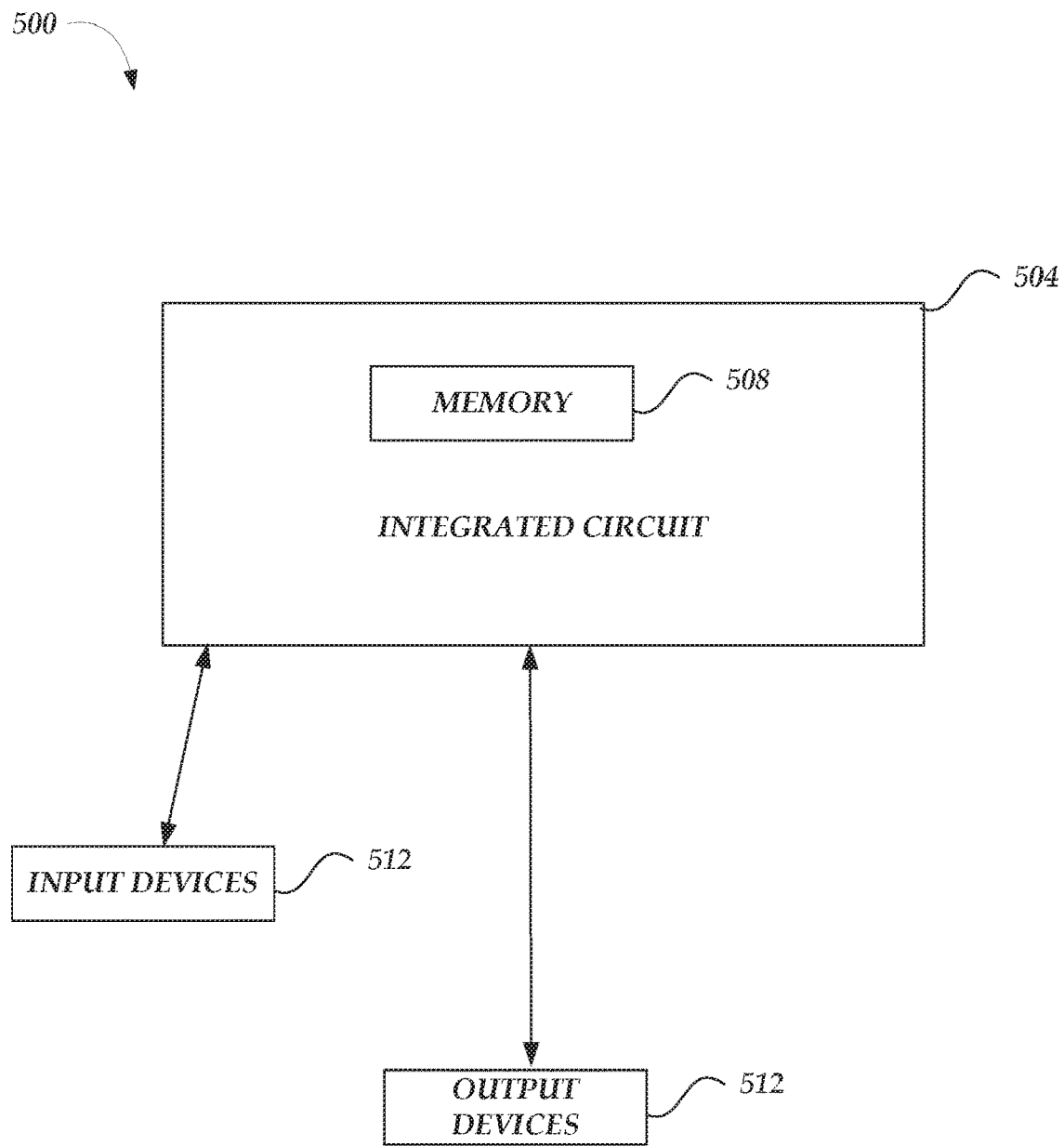
FIG. 5 is a block diagram of an example apparatus in accordance with various examples of the present disclosure.

FIG. 5 is a block diagram of a system 500 including an integrated circuit 504. The integrated circuit 504 may be implemented by any of the example apparatuses described herein, such as apparatus 100, 200, or 300. The integrated circuit 504 may include a memory 508. The integrated circuit 504 may be coupled through address, data, and control buses to the memory device 508 to provide for writing data to and reading data from the memory 508. The integrated circuit 504 includes circuitry for performing various processing functions, such as executing specific software to perform specific calculations or tasks. In performing such various processing functions, the integrated circuit 504 may utilize the methods described herein to forward to a common operand. In addition, the integrated circuit 504 includes one or more input devices 512, such as a keyboard or a mouse, coupled to the integrated circuit 504 to allow an operator to interface with the integrated circuit 504. The integrated circuit 504 also includes one or more output devices 512 coupled to the integrated circuit 504, such as output devices 512 typically including a printer and a video terminal.

Certain details are set forth above to provide a sufficient understanding of described embodiments. However, it will be clear to one skilled in the art that embodiments may be practiced without various of these particular details. The description herein, in connection with the appended drawings, describes example configurations and does not represent all the examples that may be implemented or that are within the scope of the claims. The terms "exemplary" and "example" as may be used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Techniques described herein may be used for various wireless communications systems, which may include multiple access cellular communication systems, and which may employ code division multiple access (CDMA), time division multiple access (TDMA), frequency division multiple access (FDMA), orthogonal frequency division multiple access (OFDMA), or single carrier frequency division multiple access (SC-FDMA), or any a combination of such techniques. Some of these techniques have been adopted in or relate to standardized wireless communication protocols by organizations such as Third Generation Partnership Project (3GPP), Third Generation Partnership Project 2 (3GPP2) and IEEE. These wireless standards include Ultra Mobile Broadband (UMB), Universal Mobile Telecommunications System (UMTS), Long Term Evolution (LTE), LTE-Advanced (LTE-A), LTE-A Pro, New Radio (NR), IEEE 802.11 (WiFi), and IEEE 802.16 (WiMAX), among others.

The various illustrative blocks and modules described in connection with the disclosure herein may be implemented or performed with a general-purpose processor, a digital signal DSP, an FPGA, an application-specific integrated circuit (ASIC), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

Various functions described herein may be implemented in hardware, software executed by a processor, firmware, or any combination thereof. If implemented in software (e.g., in the case of the methods described herein), the functions may be stored on or transmitted over as one or more instructions or code on a computer-readable medium. Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), or optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

From the foregoing it will be appreciated that, although specific embodiments of the present disclosure have been described herein for purposes of illustration, various modifications may be made without deviating from the spirit and scope of the present disclosure. The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
providing, on an interconnect of an integrated circuit, a first control signal indicative of a common operand to an operation mode control of a first digital signal processor (DSP) of a plurality of DSPs in the integrated circuit; and
responsive to the first control signal indicative of the common operand, providing the common operand to an output of the first DSP, wherein providing the common operand to the output of the first DSP comprises providing the common operand from an operand input of an operand register to the output of the first DSP via a direct connection between the operand input of the operand register and the output of the first DSP.

2. The method of claim 1, further comprising:
obtaining the common operand at a second DSP of the plurality of DSPs, the second DSP coupled to the output of the first DSP for processing of the common operand with at least another operand of the second DSP.

3. The method of claim 1, farther comprising:
loading an instruction set associated with operations to be performed on the plurality of DSPs, including the first DSP, wherein the operations to be performed on the plurality of DSPs include operations utilizing the common operand.

4. The method of claim 3, further comprising:
based on the instruction set associated with the operations to be performed on the plurality of DSPs, determining that the common operand of the integrated circuit is to be provided to a second DSP of the plurality of DSPs.

5. The method of claim 4, further comprising:
processing the common operand at the first DSP and the second DSP to generate respective output operands associated with the common operand.

6. The method of claim 3, wherein determining the instruction set associated with the operations to be performed on the plurality of DSPs comprises determining that a learning operation is to calculate a branch of a decision tree, the branch associated with the common operand.

7. The method of claim 1, further comprising:
providing, on the interconnect of the integrated circuit, a second control signal indicative of a calculated operand to the operation mode control of the first DSP of the plurality of DSPs;
responsive to the second control signal indicative of the calculated operand, changing an operation mode of the first DSP to an operation mode that calculates obtained operands; and
providing the calculated operand to the output of the first DSP based on the obtained operands having been calculated at the first DSP to generate the calculated operand.

8. The method of claim 7, further comprising:
calculating the obtained operands based on the first DSP implementing at least one of an adder mode, a multiplier mode, an accumulator mode, a multiply-accumulate mode, a carry-in mode, a carry-out mode, or any combination thereof.

9. The method of claim 7, further comprising:
obtaining the calculated operand at a second DSP of the plurality of DSPs, the second DSP coupled to the output of the first DSP for processing of the calculated operand with at least another operand of the second DSP slice.

10. The method of claim 1, further comprising:
responsive to the first control signal indicative of the common operand, obtaining the common operand at an input of the first DSP to be provided via a coupling of the input of the first DSP to the output of the first DSP, wherein providing the common operand to the output of the first DSP comprises providing the common operand via the coupling of the input of the first DSP to the output of the first DSP.

11. An apparatus, comprising:
a plurality of digital signal processors (DSPs), including a first DSP and a second DSP; and
an interconnect configured to couple the plurality of DSPs,
wherein the first DSP is coupled to an input of the second DSP to an output of the first DSP, the first DSP comprising:
an operation mode control configured to receive a control signal indicative of a common operand, wherein the first DSP is configured to obtain the common operand and to provide the common operand to the second DSP, and
wherein the first DSP is further configured to provide the common operand from an operand input of an operand register to the output of the first DSP via a direct connection between the operand input of the operand register and the output of the first DSP.

12. The apparatus of claim 11, wherein first DSP is coupled to the input of the second DSP to the output of the first DSP by at least one of a forwarding circuit, a flip-flop circuit, a direct coupling, or any combination thereof.

13. The apparatus of claim 11, wherein the output of the first DSP comprises an output of the operand register of the first DSP, the operand register configured to store the obtained common operand.

14. A method comprising:
providing, on an interconnect of an integrated circuit, a control signal indicative of a common operand to an operation mode control of a digital signal processor (DSP) in the integrated circuit;
providing, on the interconnect of the integrated circuit, a selection signal indicating a selection of the common operand to a switch of the DSP;
responsive to the control signal indicative of the common operand, selecting the common operand at the switch of the DSP;
providing the common operand to a plurality of configurable logic units of the DSP; and providing, from an output of the switch of the DSP, the common operand to an operand register of the DSP via direct coupling between the output of the switch and the operand register.

15. The method of claim 14, wherein providing the common operand to the plurality of configurable logic units of the DSP comprises providing a stored version of the common operand from the operand register to the plurality of configurable logic units.

16. The method of claim 14, further comprising:
loading an instruction set associated with operations to be performed on the DSP, including operations utilizing the common operand.

17. The method of claim 16, wherein determining the instruction set associated with the operations to be performed on the DSP comprises determining that a learning operation is to calculate a branch of a decision tree, the branch associated with the common operand.

18. The method of claim 14, further comprising:
calculating, at the plurality of configurable logic units of the DSP, the common operand and additional operands based on the DSP implementing at least one of an adder mode, a multiplier mode, an accumulator mode, a multiply-accumulate mode, a carry-in mode, a carry-out mode, or any combination thereof.

* * * * *